United States Patent [19]
Smith, Jr.

[11] Patent Number: 4,792,711
[45] Date of Patent: Dec. 20, 1988

[54] ELECTRIC GENERATOR FOR INDUCING CURRENT IN THE FIELD COIL

[76] Inventor: Berry E. Smith, Jr., Star Rte. 1, Box 3921, Tallahassee, Fla. 32304

[21] Appl. No.: 54,722

[22] Filed: May 27, 1987

[51] Int. Cl.⁴ .......................................... H02K 16/02
[52] U.S. Cl. ................................... 310/114; 310/104; 310/86; 310/156
[58] Field of Search ................. 310/268, 273, 114, 86, 310/152, 153, 156, 168, 171, 254, 257, 259, 67 A, 70 R, 104

[56] References Cited
U.S. PATENT DOCUMENTS
3,538,703 11/1970 Walton .............................. 310/46 X
4,297,604 10/1981 Tawse .............................. 310/268 X Primary Examiner—Patrick R. Salce
Assistant Examiner—Judson H. Jones
Attorney, Agent, or Firm—Earl L. Tyner

[57] ABSTRACT

An electric generator having a stationary field coil, a rotatable armature of permanent magnets, and between the coil and the armature a stationary cylindrical cage of strips of a conductor of magnetic flux extending across the coil and the magnets, the magnets being mounted on a wheel or disc structure adjacent to the field coil.

15 Claims, 3 Drawing Sheets

ELECTRIC GENERATOR FOR INDUCING CURRENT IN THE FIELD COIL

BACKGROUND OF THE INVENTION

Electric generators are well known devices for generating electricity by turning an armature of a plurality of copper wires through the magnetic flux produced in the field coil by passing electricity through copper wire wrapped around cores of soft iron. The electricity generated in the armature is withdrawn by slip rings as A.C. current, or by a commutator as D.C. current. Very little time has been spent in the prior art on generators which induce the current in the field coil. Such a generator is described in U.S. Pat. to Smith, Jr. and Sharron, No. 4,612,470, and in U.S. Pat. No. 4,719,380 by the same inventors. These inventions describe generators having a stationary field coil, a rotatable armature of permanent magnets, and between the coil and the armature a rotatable warp sleeve of alternating strips of magnetically conductive material and magnetically nonconductive material. While these devices are operable and efficient, there are improvements which have been found to make the devices even more satisfactory.

It is an object of this invention to provide an improved electric generator of the type which induces current in the field coil. It is another object of the invention to provide an improvement wherein the permanent magnets rotate outside the confinement of the field coil. Still other objects will become apparent from the more detailed description which follows.

BRIEF SUMMARY OF THE INVENTION

This invention relates to an electric generator which includes a stationary field coil, a rotatable armature, and a stationary cage of magnetically conductive material positioned between the coil and the armature; said coil comprising a plurality of turns of electrically conductive wire in an electrically nonconductive frame with a tubular passageway therethrough; said armature comprising a rotatable shaft, a wheel structure mounted on said shaft with an even number of permanent magnets mounted on the periphery thereof in an arrangement of alternating polarity, said wheel structure being positioned adjacent to but outside of said field coil; said cage comprising a plurality of elongated linear strips of thin magnetically conductive material equally spaced in cylindrical arrangement parallel to the central axis of the cylinder and extending through the tubular core of said field coil and outwardly to a position adjacent the magnets on said wheel, said strips being spaced part such that any instant all of said strips are adjacently facing said magnets of the same polarity.

In specific embodiments of the invention the outside diameter of the magnets may be larger than or slightly less than the inside diameter of the coil; and the field coil is formed in layers of wire separated from the next adjacent layer of wire by a film of dielectric material. In still other embodiments the field coil is made in a stepped down depth of windings with the deepest being near the magnets and the shallowest being the farthest away from the magnets. The cage may be designed with the magnetically conductive strips lying fact-to-face with the magnets, or the edge of the strips may lie adjacent to the face of the magnet.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
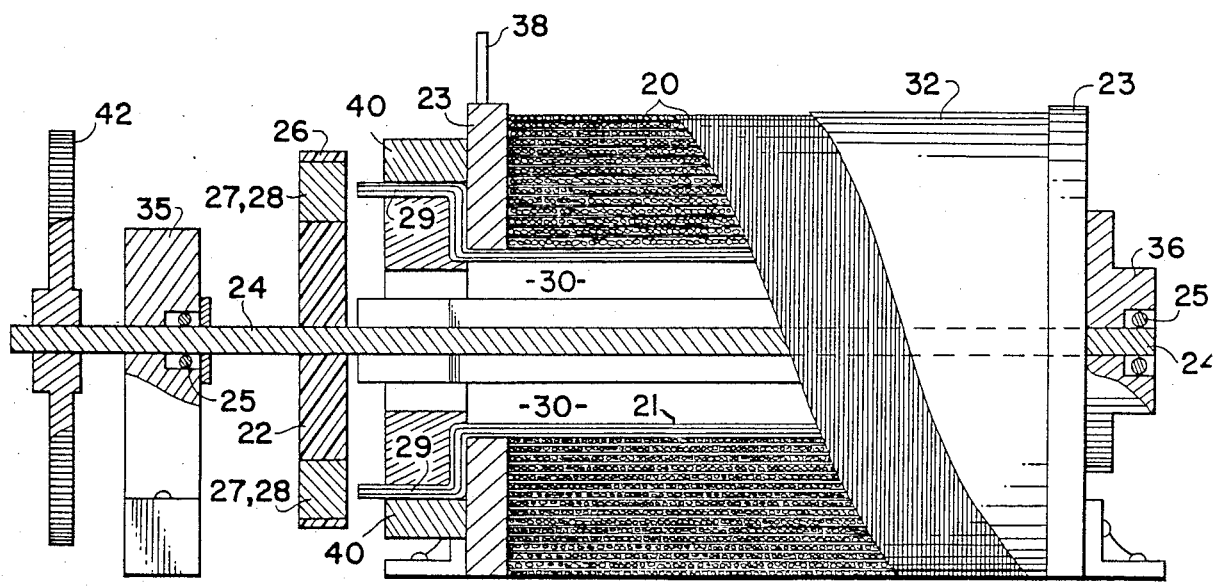
FIG. 1 is a front elevational view of the generator of this invention.
Figure 2:
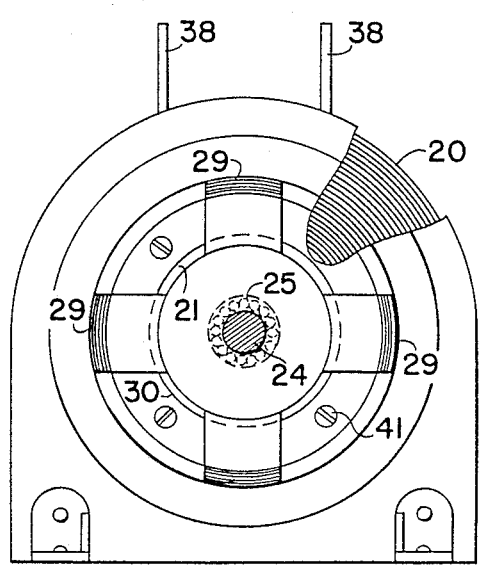
FIG. 2 is a cross sectional view taken at 2—2 of FIG. 1.

The features of this invention are best understood by reference to the attached drawings, particularly FIGS. 1-2 wherein the assembled invention is depicted.

The generator of this invention has three principal parts; namely, the field coil 20, the armature 22, and the magnetic flux propagation cage 21. Coil 20 and cage 21 are stationary and are attached to each other. Armature 22 is rotatable about shaft 24 which is set in bearings 25 at each end of shaft 24. At one end (left hand end in FIG. 1) the bearing 25 is mounted in support 35. At the other end (right hand in FIG. 1) bearing 25 is mounted in a plug structure 36 affixed to end plate 23. Armature 22 is rotated by a belt or chain driving wheel 42 which is rigidly attached to shaft 24.

Figure 3:
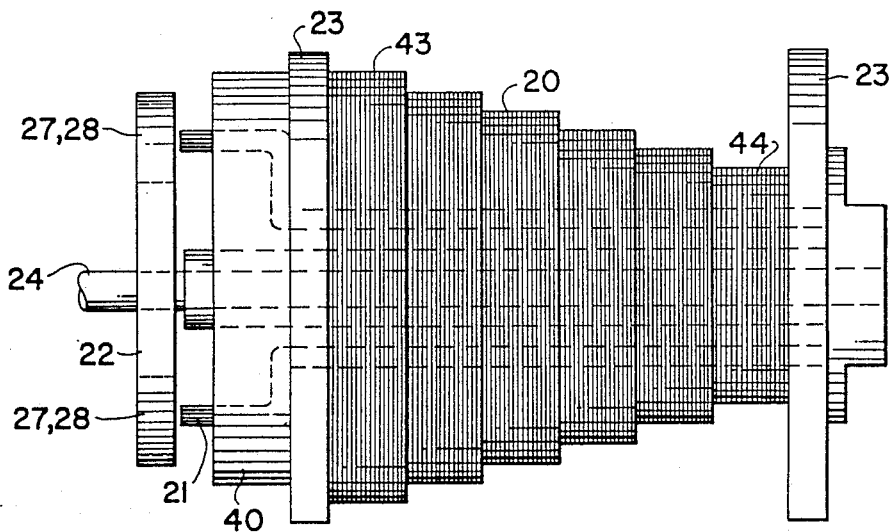
FIG. 3 is a front elevational view of the generator with a stepped field coil.
Figure 4:
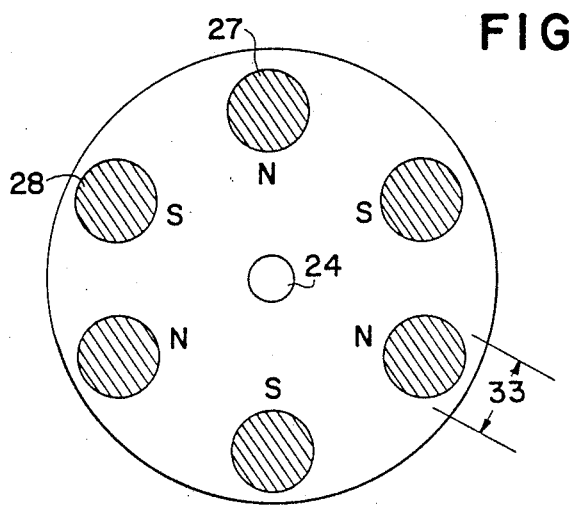
FIG. 4 is a front elevational view of a magnet wheel with 6 magnets.
Figure 5:
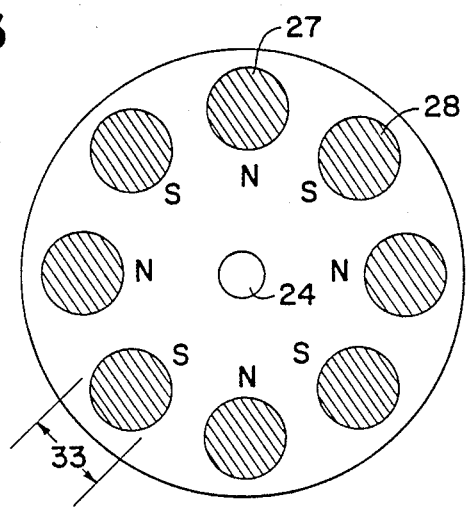
FIG. 5 is a front elevational view of a magnet wheel with 8 magnets.
Figure 6:
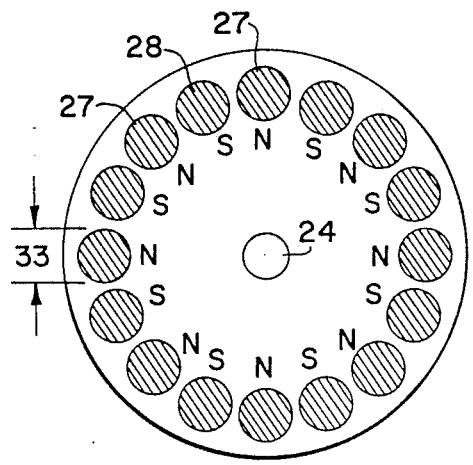
FIG. 6 is a front elevational view of a magnet wheel with 16 magnets.
Figure 7:
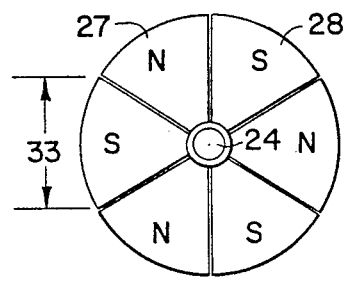
FIG. 7 is a front elevational view of a second type of magnet wheel.

Field coil 20 is a plurality of turns of electrically conductive wire, preferably copper insulated wire. A single continuous length of wire is preferred with the two ends attached to terminals 38. It is entirely operable to employ two or more separate lengths of wire with each length having its own terminals, but this arrangement is not as efficient as a single length of wire. An especially desirable arrangement is that shown in FIG. 8 wherein the wire is in layers 31 extending across the widthoof coil 20 from end plate 23 to the other end plate 23, each layer 31 being separated from the next adjacent layer 31 by a film of dielectric material 32. Generally film layer 32 will be one continuous strip of material when wire layer 31 is formed of one continuous length of wire. FIG. 3 shows an alternative design for coil 20 where it is formed in a plurality of steps having less and less turns of wire in portions of the coil which are farther and farther from the magnets 27, 28 on wheel structure 26 of armature 22. Thus, portion 43 has many wire turns and is the deepest part of field coil 20 while portion 44 has the least number of turns and is farthest from magnets 27, 28. This design is preferred in saving the amount of wire used in coil 20.

Figure 8:
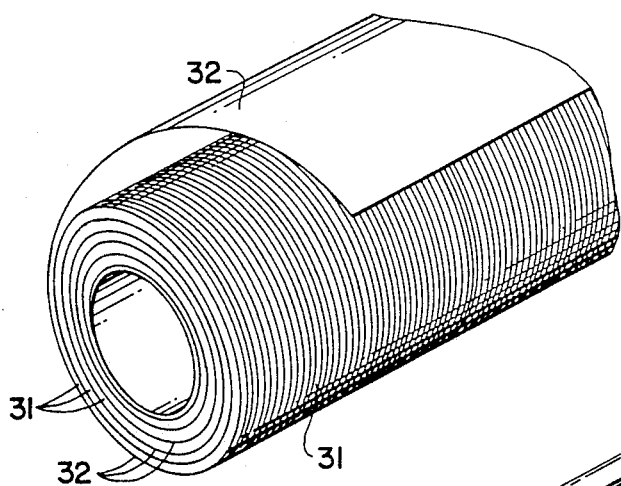
FIG. 8 is a perspective view of the preferred structure of the field coil.

Cage 21 is a cylindrically shaped structure of parallel strips 29 of magnetically conductive material, e.g., iron or steel. Strips 29 are spaced equally around the cylindrically shaped structure 21 with the spaces between strips 29 being empty space or being a nonconductive material, i.e., one which will not conduct magnetic flux. Plastics, paper, wood, aluminum or the like are suitable materials for this purpose. Tubular cage 21 is affixed to end plates 23 of coil 20 so as to form at least a part of the central core of the frame which supports the wire turns 31 and dielectric film layers 32 as shown in FIG. 8. The length of cage 21 is greater than the distance between end plates 23 (width of coil 20). Cage 21 extends outwardly beyond one of end plates 23, while the other end of cage 21 is generally aligned with the other end plate 23. The excess of cage 21 which extends beyond coil 20 designed to be closely adjacent to magnets 27 and 28 of armature 22 so as to receive magnetic flux therefrom.

Armature 22 comprises a shaft 24 mounted so as to be rotatable around the central axis of coil 20 and of cage 21. This is accomplished by bearings 25 set in support 35 and in plug structure 36 as described above. At the end of shaft 24 where cage 21 extends beyond coil 20 there is a wheel or disc structure 26 mounted on shaft 24 to support magnets 27 and 28 with their faces in close proximity to the magnetically conductive strips 29 of cage 21. Permanent magnets 27 and 28 are mounted rigidly on wheel structure 26 near the outer periphery thereof, and in an alternating arrangement of polarities, i.e., every other magnet has its north polarity 27 facing outwardly while the magnets in between have their south polarity 28 facing outwardly. It is not desirable that adjacent magnets touch each other but it is preferable that they be as close as possible. The shape of magnets 27 and 28 is also not a critical matter (cf. FIGS. 4-7). It is important, however, that the width of the outward face 33 of magnet 27 and 28 be substantially the same as the width 34 of each strip 29 of cage 21. This is because strips 29 conduct the magnetic flux received from magnets 27 and 28 to the wires in field coil 20 to cause the induction of electric current therein. The spacing and arrangement of strips 29 in cage 21 is such that any instant in the rotation of armature 22 all of strips 29 are facing the same polarity of magnets 27 and 28, i e., when one strip 29 is facing a magnet with north polarity 27, all of the other strips 29 are also facing a magnet of north polarity 27; and similarly, when a strip 29 is facing a magnet with south polarity 28, all other strips 29 are also facing a magnet of south polarity 28. The more there are of strips 29 the better for the efficiency of the generator. The generator will, however, operate with only two strips 29. The number of magnets 27 and 28 on armature 22 will always be even and, therefore, the number of strips 29 will always be a maximum of one-half of the total number of magnets, but may be odd or even. If armature 22 contains four magnets 27 and 28, the number of strips must be two. If armature 22 contains six magnets 27 and 28, cage 21 must have three strips 29. If armature 22 contains ten magnets 27 and 28, cage 21 must contain five strips 29, since no other number can be equally spaced around a cylinder and face only magnets of the same polarity at any one time. If there are twelve magnets, cage 21 may have two, three, four, or six strips 29.

Figure 9:
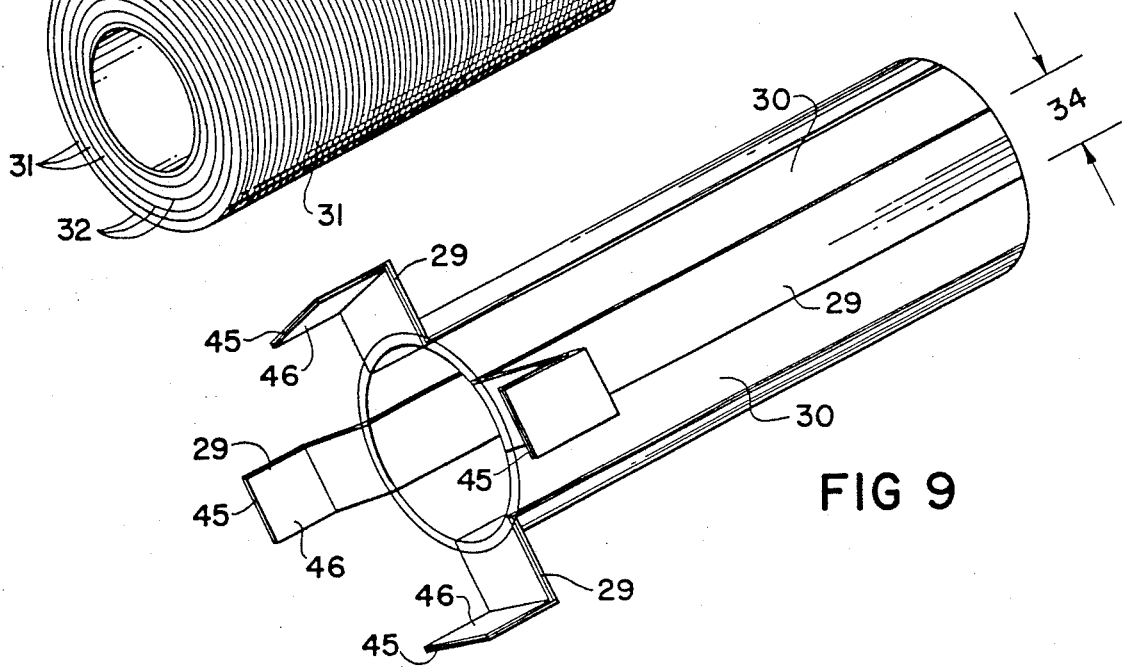
FIG. 9 is a perspective view of one type of magnetic propagation cage of this invention.
Figure 13:
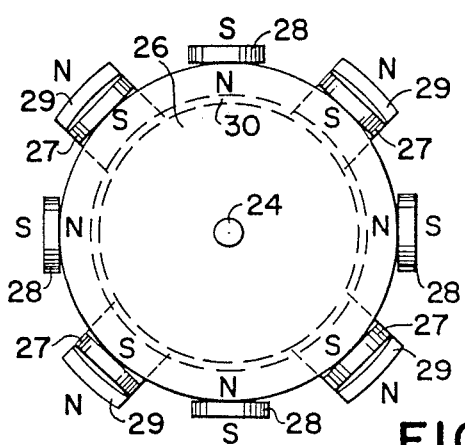
FIG. 13 is an end elevational view of the cage of FIG. 12.

In the attached drawings there are shown three embodiments of cage 21. One is a simple structure of one internal diameter throughout its length (see FIGS. 10 and 11). Preferred embodiments of this invention, however, include a cage 21 which has one diameter for the portion of its length that is within coil 20 and another diameter for the portion that is adjacent to magnets 27 and 28. That second diameter is larger than the diameter of the core of coil 20 so as to accommodate more magnets 27, 28 or larger magnets 27, 28. Of course, strips 29 in cage 21 must be bent to reflect the two different diameters. Exactly how the bends are made in strips 29 is not critical. The only requirements are that those portions which are within coil 20 must be close to the wire in coil 20 and those which are outside of coil 20 must be in close proximity to the magnets so as to receive magnetic flux therefrom. If magnets 27, 28 are mounted on the outside rim of wheel or disc structure 26 so that the faces (north or south) are directed radially outwardly, as in FIGS. 12 and 13, the magnetically conductive strips 29 of cage 21 must be bent as shown in FIG. 9 so the flat faces 46 of strips 29 come into close proximity with the faces of magnets 27 and 28. In another embodiment (see FIGS. 1-3) cage 21 is made as shown in FIG. 9, but the edges 45 are caused to come into close proximity with the faces of magnets 27 and 28. In this embodiment, wheel 26 is made with magnets 27 and 28 facing parallel to the axis of wheel 26 rather than radially as in FIGS. 12 and 13. In this embodiment, it is preferred to make strips 29 of laminated silicone steel.

Figure 11:
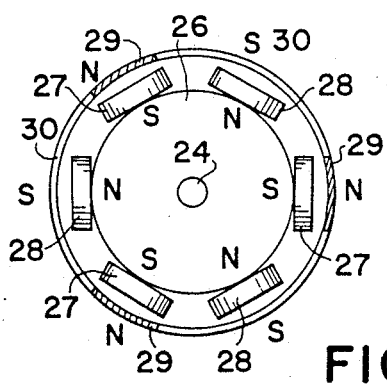
FIG. 11 is an end elevational view of the cage of FIG. 10.
Figure 10:
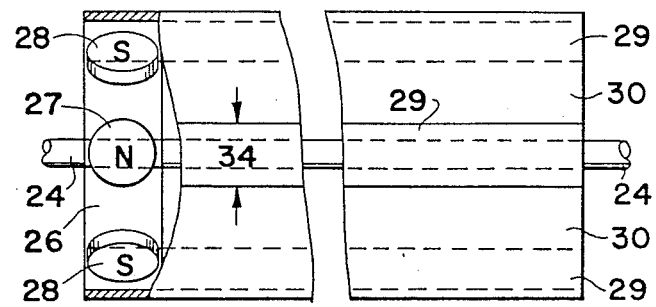
FIG. 10 is a front elevational view of a second type of magnetic propagation cage of this invention.
Figure 12:
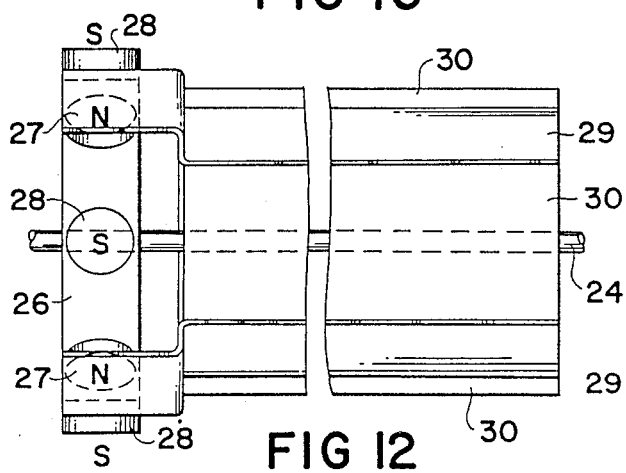
FIG. 12 is a front elevational view of a third type of magnetic propagation cage of this invention.

The embodiment shown in FIGS. 10-11 is the simplest structure, but it is not preferred because it is limited in operating efficiently by the internal diameter of field coil 20. Here cage 21 is a simple cylinder of the same size inside of coil 20 and outside of coil 20. Being the same size outside of coil 20 makes it necessary to restrict the size of wheel structure 26 holding magnets 27, 28. Generally this means using a minimum number of magnets 27, 28, which in turn limits the current output of the generator or causes it to be operated at higher speeds than desirable. By comparison to FIGS. 12 and 13 it may be seen that a larger number of magnets may be employed if the outer portion of cage 21 is larger than the core of field coil 20.

The following are illustrative examples of the operation of generators according to this invention.

EXAMPLE 1

The generator had a stepped field coil as in FIG. 3 of 3900 ft. of 28 gauge insulated copper wire. The magnetic flux propagation cage was made in the design of FIG. 9 with four laminated silicone steel blades 0.114 inch thick×0.437 inch wide×4.5 inches long. The magnet wheel was made similar to that of FIG. 5 and consisted of eight Jobmax #18 disc magnets (0.5 inch in diameter×0.375 inch thick). The output of the generator was connected to a Simpson Wattmeter and to a 7 watt light bulb. The magnet wheel was turned at a speed of 900 rpm and the output was measured at 119 volts, 60 cycles, and 0.038 amps which is equivalent to 4.522 watts.

EXAMPLE 2

The generator of this example employed a field coil as in FIGS. 1 and 8 consisting of 2500 ft. of 32 gauge insulated copper wire. The propagation cage consisted of three blades of laminated silicone steel as in FIG. 9, each blade being 0.125 inch thick×0.375 inch wide×1.5 inches long. The magnet wheel was similar to that of FIG. 4 with six Jobmax #27 disc magnets (0.33 inch diameter×0.375 inch thick. The magnet wheel was turned at 1200 rpm and the output was measured as 115 volts, 60 cycles and 0.0265 amps, which is equivalent to 3.05 watts.

EXAMPLE 3

In this example the generator had a field coil as in FIGS. 1 and 8 of 4760 ft. of 28 gauge insulated copper wire. The propagation cage was of the design in FIG. 9 with three blades of laminated silicone steel 0.125 inch thick×0.437 inch wide×2.75 inches long. The magnet wheel was similar to that of FIG. 4 with six Jobmax #27 disc magnets each 0.5 inch in diameter and 0.25 inch thick. The output of the generator operating at 1200 rpm was measured to be 118 volts, 60 cycles, and 0.0378 amps, which is equivalent to 4.4 watts.

EXAMPLE 4

The generator of this example had a field coil of the standard shape as in FIGS. 1 and 8 with 3800 ft. of 30 gauge insulated copper wire. The propagation cage was of the design of FIG. 9 with three blades of laminated silicone steel each 0.114 inch thick×0.437 inch wide×3.5 inches long. The magnet wheel was similar to that of FIG. 4 with six Jobmax #18 disc magnets each 0.5 inch in diameter and 0.375 inch thick. The output of the generator measured 120 volts, 60 cycles, and 0.034 amps, which is equivalent to 4.08 watts.

EXAMPLE 5

The generator of this example included a field coil of the standard shape (FIGS. 1 and 8) with 3800 ft. of 30 gauge insulated copper wire. The propagation cage was of the design of FIG. 9 with three blades of laminated silicone steel 0.114 inch thick×0.437 inch wide×4.5 inches long. The magnet wheel was of the design of FIGS. 4, 5 and 6 but with twelve Jobmax #18 disc magnets each 0.5 inch diameter and 0.375 inch thick. The magnet wheel was turned at 600 rpm and the output of the generator was measured to be 120 volts, 60 cycles, and 0.035 amps which is equivalent to 4.2 watts.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An electric generator including a stationary field coil, a rotatable armature, and a stationary cage of magnetically conductive material positioned between the coil and the armature; said coil comprising a plurality of turns of electrically conductive wire in an electrically nonconductive frame with a tubular passageway therethrough; said armature comprising a rotatable shaft, a wheel structure mounted on said shaft with an even number of permanent magnets mounted on the circumference thereof in an arrangement alternating polarity, said wheel being positioned adjacent to but outside of said field coil; said cage comprising a plurality of elongated linear strips of thin magnetically conductive material equally spaced in cylindrical arrangement parallel to the central axis of the cylinder and extending through the tubular core of said field coil and outwardly to a position adjacent the magnets on said wheel, with said strips being spaced apart such that at any instant all of said strips are conducting the same polarity from said magnets.

2. The generator of claim 1 wherein the width of said strips is substantially the same as the width of each said magnet facing said strips.

3. The generator of claim 1 wherein the outside diameter of said magnets on said wheel is slightly less than the inside diameter of said cage facing said magnets.

4. The generator of claim 1 wherein the outside diameter of said magnets on said wheel is larger than the inside diameter of said field coil.

5. The generator of claim 1 which additionally comprises said turns of wire in said field coil being arranged in concentric layers, one wire in thickness with a layer of dielectric material separating adjacent layers of wire.

6. An electric generator including a field coil, a magnetic flux propagating cage, and an armature; said field coil comprising a frame having a central tubular core and two spaced end plates perpendicular to the axis of said core, a plurality of turns of electrically conductive wire wrapped around said core in the space between said end plates; said propagation cage comprising a cylindrical arrangement of equally spaced parallel strips of magnetically conductive material contiguous to the inside surface of said tubular core and extending outwardly of one of said end plates; said armature comprising a shaft with a disc-like structure adjacent one end thereof with a plurality of permanent magnets mounted around the periphery of said disc structure in an arrangement whereby alternating magnets having opposite polarity facing outwardly, the outside diameter of said magnets being closely adjacent to the inside diameter of said cage at said end which is outwardly of one end plate, the number and size of said magnets and the number and size of said strips being coordinated such that the width of each said strip is substantially equal to the width of each said magnet, and the number and spacing of said strips are such that at any instant said strips are all conducting the same polarity from said magnets.

7. The generator of claim 6 wherein said number of magnets is 4, 6, 8, or 12 and the number of said strips is 2, 3, 4, or 6.

8. The generator of claim 6 wherein said field coil is a plurality of concentric layers of wire separated from the next adjacent layer by a thin film of a dielectric material.

9. The generator of claim 6 wherein said cage has the same inside and outside diameters over its entire length.

10. The generator of claim 6 wherein the said cage has an inside diameter which is larger where it faces said magnets than where it passes through said field coil.

11. The generator of claim 6 wherein said magnets on said disc structure are attached to the circumference of said disc and face outward in a radial direction.

12. The generator of claim 6 wherein said magnets on said disc structure are attached adjacent the circumference of said disc and face in a direction parallel to the axis of said disc.

13. The generator of claim 12 wherein said strips terminate adjacent said magnets with an edge of each said strip spaced apart from the face of said magnets and aligned with a circle passing through the center of all said magnets.

14. The generator of claim 13 wherein said strips are laminated silicone steel.

15. The generator of claim 6 wherein said field coil is a stepwise plurality of turns of wire, each step having a different depth of winding measured from said core radially outward, the step having the greatest depth being at said end plate adjacent said magnets and the step having the least depth being at the end plate farthest from said magnets.

* * * * *